United States Patent
Löffler et al.

[11] Patent Number: 5,842,409
[45] Date of Patent: Dec. 1, 1998

[54] SUPPORT ASSEMBLY FOR COOKING FOWL

[75] Inventors: Erhard Löffler, Türkheim/Irsingen, Germany; Daulton Baker, Noranda, Australia

[73] Assignee: Rational GmbH, Lech, Germany

[21] Appl. No.: 787,855

[22] Filed: Jan. 23, 1997

[30] Foreign Application Priority Data

Jan. 24, 1996 [AU] Australia .................................. PN7724

[51] Int. Cl.$^6$ .............................. A47J 43/18; A47J 37/04
[52] U.S. Cl. .............................. 99/421 V; 99/419; 99/426
[58] Field of Search .................................. 99/421 V, 426, 99/427, 419, 421 R

[56] References Cited

U.S. PATENT DOCUMENTS

| | | | |
|---|---|---|---|
| 4,421,017 | 12/1983 | Ross | 99/426 X |
| 5,442,999 | 8/1995 | Meister | 99/426 |

*Primary Examiner*—Reginald L. Alexander
*Attorney, Agent, or Firm*—Patton Boggs LLP

[57] ABSTRACT

A support assembly for holding a chicken or the like for cooking, comprising a support member 11 arranged to extend into the body cavity of the chicken through the posterior end of the chicken cut away during butchering and lie against the backbone region 35. A trussing member 15 extends from the support member 11 at a position proximal to where the posterior end of the chicken locates, and provides a surface on which the drumsticks/legs of the chicken may locate in crossed configuration. At the end of the trussing member 15, located away from the support member 11 is a second support member 19 which is also arranged to extend into the body cavity of the chicken through the posterior end of the chicken cut away during butchering and lie against the keel region 33. The support assembly may be provided with fittings to allow retrofitting to existing cooking trays, or may be welded directly to purpose built racks. The support assembly holds the drumsticks/legs adjacent to the posterior end of the chicken cut away during butchering thereby minimising spillage of any savoury stuffing, and also holds the drumsticks/legs against the body, to minimise the drumsticks/legs becoming overcooked and dried out while the breast meat attains optimal cooking.

16 Claims, 9 Drawing Sheets

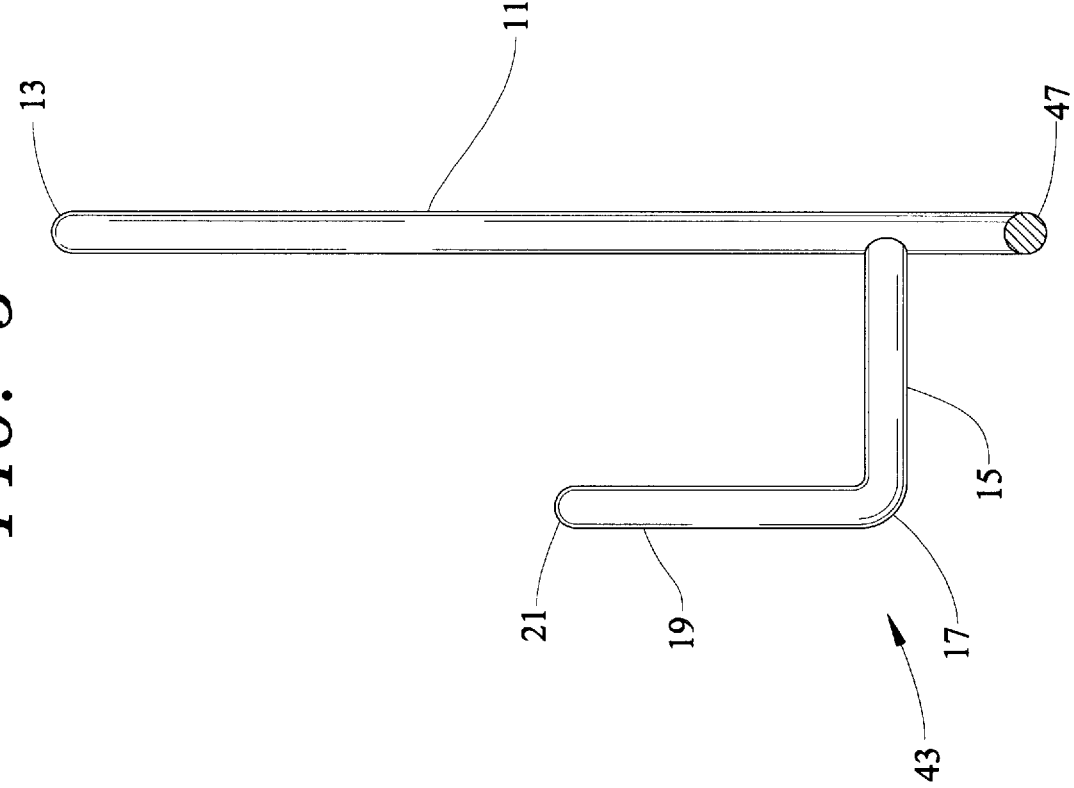
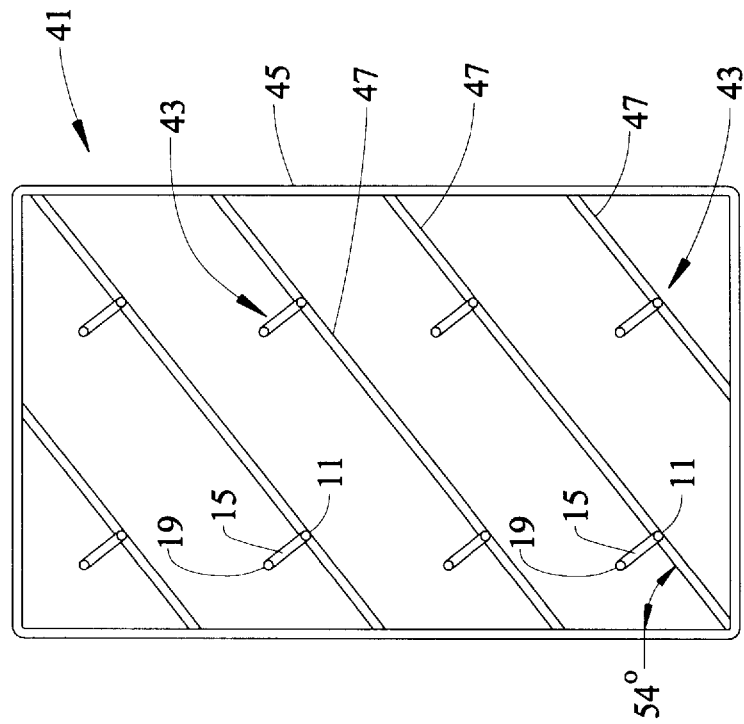

SUPPORT ASSEMBLY FOR COOKING FOWL

This invention relates to a support assembly for holding fowl for cooking. The invention has particular application for holding chickens, for cooking or roasting in steam or convection ovens.

In this specification, the term fowl includes all gallinaceous birds including domesticated and game types, and other similar birds such as quail.

BACKGROUND ART

The cooking of large quantities of chickens has generally been achieved using steam and/or convection ovens. In European and other markets where it is generally not required to fill the body cavity of the chicken with a savoury stuffing or the like, it has been a common practice to support the chicken in a vertical position by use of "A-frame" stand, which is generally formed integrally with a rack which may be slid in and out of the oven. Such an arrangement of an "A-frame" stand is not suitable for cooking a chicken which includes a savoury stuffing or the like, as the stuffing will mould around the "A-frame", preventing the cooked chicken from being readily removed therefrom, and resulting in loss of the stuffing. A further disadvantage is that the legs of the chicken hang down from the body, depending generally away therefrom, which can result in the legs becoming overcooked and dried out, when compared with the degree of cooking the remainder of the chicken. A further disadvantage is that the chicken cooked on the "A-frame" stand can take on a stretched or elongated appearance, which is considered to be not as pleasing as the result which can be achieved if the chicken is trussed. However, trussing of the chicken adds labour costs, and for reasons of economy is generally avoided.

Another popular method of cooking chickens is using rotisserie cookers which comprise a horizontally turning spit In such an arrangement, the spit comprises a horizontal stainless steel rod upon which the chicken is placed. Such an arrangement is suitable for cooking chickens with stuffing, as the rod does not interfere with removal of the cooked chicken therefrom. One technique of avoiding a stretched appearance of a roasted chicken is to truss the chicken with its legs crossed under the lower carcass area. In such a technique, the chicken legs are trussed, or held in crossed position by a rubber ring or the like.

This invention seeks to provide a support assembly for holding chickens or the like for cooking, which obviates at least some of the aforementioned disadvantages.

DISCLOSURE OF THE INVENTION

In accordance with the invention there is provided a support assembly for holding a fowl for cooking, said support assembly including a support member arranged to extend into the body cavity of the fowl for holding the fowl; and a trussing member fixed rigidly relative to the support member and extending perpendicularly or obliquely away therefrom at a position proximal to the posterior end of the fowl (i.e. its tail end); said trussing member being provided to contact the drumsticks/legs of the fowl to cause them to be positioned in close proximity to each other so they lie against the body of the fowl.

Preferably said trussing member extends from said support member to a position forwardly toward the front of the fowl.

Preferably said trussing member contacts the drumsticks legs near or at the ends thereof.

Preferably said trussing member is configured to cause the drumsticks/legs to be positioned contacting each other.

It is most preferable that the legs are positioned in a crossed position by the trussing member. Further, it is also most preferable that the legs are crossed immediately adjacent to the posterior area cut away during butchering. This results in the access to the body cavity and stuffing contained therein, being urged substantially closed, minimising loss of stuffing. In addition, the fowl is given a more plump appearance.

The support member is most conveniently arranged to extend into the body cavity of the fowl through the posterior area cut away during butchering. In this manner, no special preparation is required before the fowl is placed on the support assembly.

For cooking a stuffed fowl, the support member may comprise a straight length of round rod, although it will be apparent that other sections of either tapered, constant or near-constant cross-section would be equally suitable For cooking an un-stuffed fowl, the support member may comprise an "A-frame" or other structure, where there is nothing to interfere with removal of the cooked fowl therefrom. In either arrangement the support member is intended to be used in an upright position, although this does not preclude the possibility that the support member may be positioned obliquely or horizontally.

In the most preferred arrangement, said trussing member comprises a rod which extends perpendicularly or obliquely to said support member. With this arrangement, the ends of the drumsticks/legs of the fowl are crossed, and site against said rod, and the fowl is urged against the trussing member, preventing the legs from becoming uncrossed. Where the support member is positioned upright, the weight of the fowl will cause the fowl to urge against the trussing member. In other arrangements where the fowl is not positioned upright, it may be necessary to provide separate means to so urge the fowl.

Alternatively, said trussing member comprises a frame extending perpendicularly or obliquely to said support member, into which the ends of the drumsticks/legs protrude, to hold them in close proximity or more preferably in crossed configuration. In such an arrangement, said trussing member may most preferably comprise a circular ring Into which the ends of the drumsticks/legs protrude. It will be clear that other arrangements which form a frame, such as a pair of parallel rods, may alternatively be suitably employed to hold the drumsticks/legs in close proximity or more preferably in crossed configuration.

Preferably the support assembly includes a second support member spaced from said support member, extending substantially parallel thereto, and extending from said trussing member, to extend into the body cavity of the fowl, against the breast-bone/keel of the fowl. In this manner the ends of the drumsticks/legs of the fowl will be prevented from moving substantially forward of the keel of the fowl, and be restrained substantially adjacent the posterior area cut away during butchering. With this arrangement, the second support member assists the trussing member to truss the fowl.

Preferably said support member and second support member are spaced sufficiently to result in the breast of the fowl being pushed out. Such an arrangement gives the cooked fowl a more plump appearance, in addition to assisting synergisticly with maintaining the legs of the fowl in a crossed position, and thereby also helping to prevent spillage from the posterior area of any savoury stuffing from the fowl.

In an alternative form the support member and second support member are integrally formed from a plate member, the rearward edge of which comprises the support member and is adapted to contact the inside of the body cavity of the fowl proximal to the backbone, and the forward edge of which comprises the second support member and is adapted to contact the inside of the body cavity of the fowl proximal to the breast-bone/keel; said plate member including an aperture disposed near where the posterior of the fowl would locate, through which the outer ends of the drumsticks/legs may extend in crossed configuration, the bottom portion of the plate member bounded by the aperture forming the trussing member. However such an arrangement has a disadvantage in that when the fowl is removed it is necessary to disturb the drumsticks/legs. If the flesh is such that it readily disintegrates as it tends towards being well cooked, damage can result to the cooked fowl when the legs are moved.

BRIEF DESCRIPTION OF THE DRAWINGS

The invention will now be described in the following description of six embodiments thereof, made with reference to the drawings, in which:

FIG. 3 is a plan view of a rack according to the second embodiment incorporating support assemblies similar to that shown in the first embodiment;

FIG. 5 is a side elevation of a support assembly for holding a chicken for cooking, as incorporated in the third embodiment;

DESCRIPTION OF THE EMBODIMENTS

Figure 1:
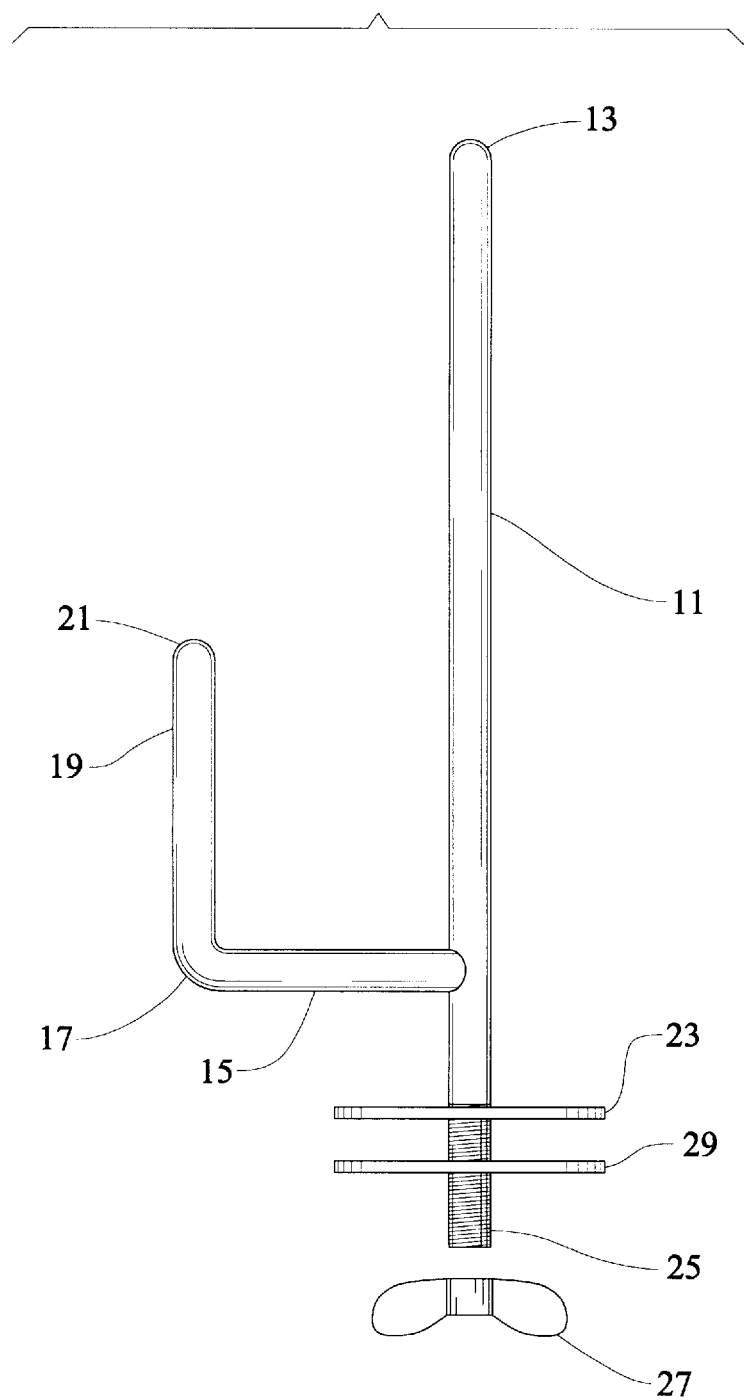
FIG. 1 is a side elevation of a support assembly for holding a chicken for cooking, according to the first embodiment.
Figure 2:
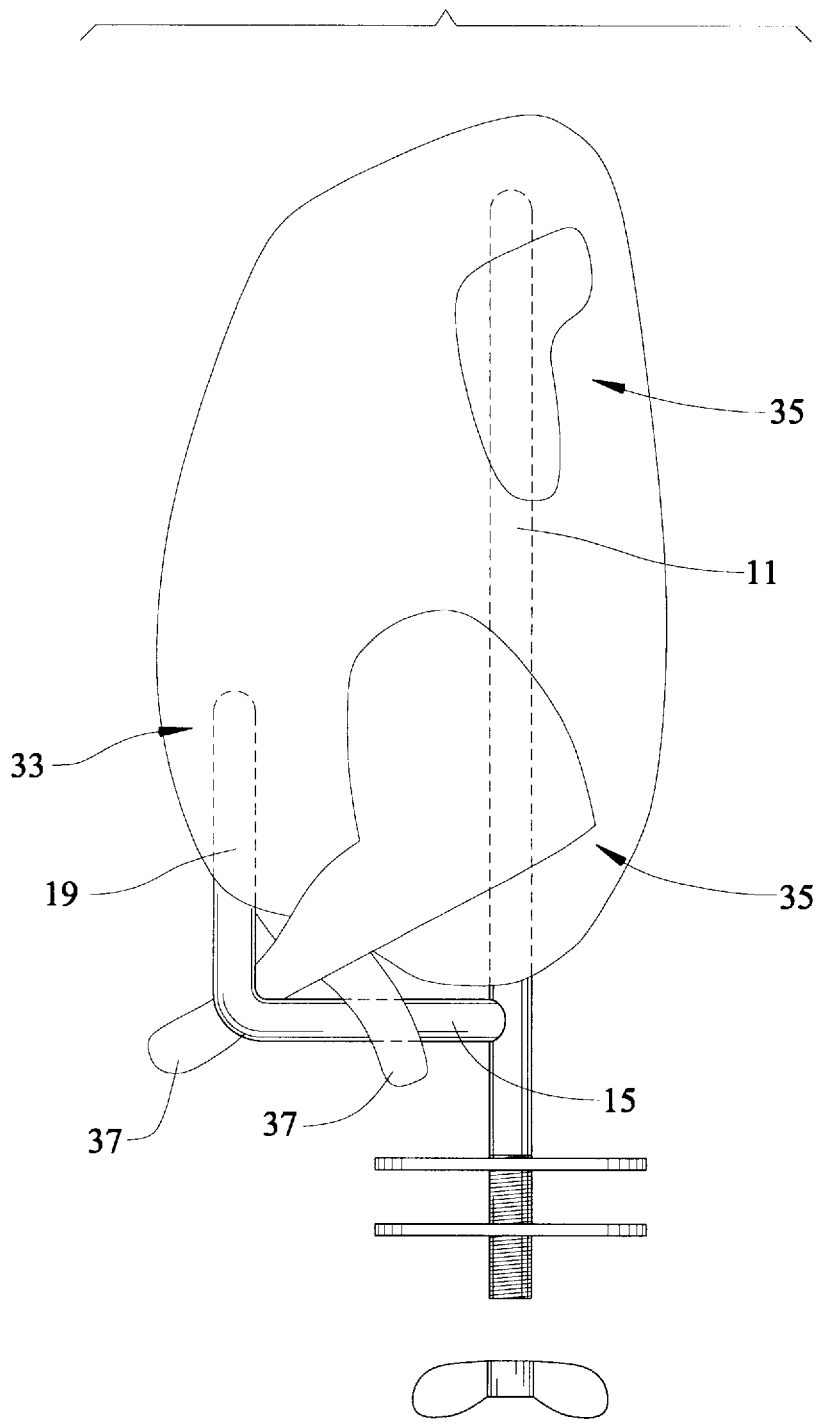
FIG. 2 is a side elevation of the support assembly shown in FIG. 1, showing it in use.

The first and most preferred embodiment, depicted in FIGS. 1 and 2, is directed toward a support assembly for holding a chicken for cooking. The support assembly comprises a central support member 11 formed of a round rod and having a rounded end 13. The central support member 11 is arranged to extend into the body cavity of the chicken, through the hole cut away at the posterior end of the chicken during butchering, and through which stuffing is also introduced into the body cavity. The end 13 is rounded to prevent the central support member 11 from becoming impaled.

Welded to, and extending from the central support member 11 at a position proximal to where the posterior end of the chicken will be located, is a trussing member 15, which is formed of round rod of the same diameter as that forming the central support member 11. The round rod which forms the trussing member 15, has a 90°, bend 17 where the end of the round rod which depends upwardly therefrom forms a second support member 19, also having a rounded end 21.

At the base of the central support member is welded a circular disc 23. The lower end 25 of the round rod forming the central support member is formed with a thread 25 so that the support assembly may be secured to a suitable base plate or the like, by a wingnut 27. A flat washer 29 is provided for stability, when the wingnut 27 is tightened.

The second support member 19 is also arranged to extend into the body cavity of the chicken, particularly, referring to FIG. 2, it can be seen that the second support member is arranged to locate internally against the breastbone or keel 33 of the chicken, while the central support member 11 is arranged to lie internally along the backbone 35 of the chicken, inside the body cavity.

In this embodiment of the support assembly, the round rod forming the central support member 11, the trussing member 15, and the second support member, comprises 6 mm diameter stainless steel rod. The circular disc 23 and flat washer 29 comprise 40 mm diameter stainless steel plate, of 2 mm thickness. The height of the central support member 11 from the rounded end 13 thereof down to the trussing member 15 is approximately 130 mm, although this size will depend on the size of the chicken which is intended to be mounted on the support assembly. The rod forming the second support member 19 is placed a distance of 40 mm (nominally) from the central support member 11. With such an arrangement, the opening Into the body cavity of the chicken is stretched which pushed the breastbone/keel of the chicken out, giving the chicken a more plump appearance, and assists in the drumsticks being drawn so that their ends may lie in a crossed position. The distance between the central support member 11 and the second support member 19 is selected depending on the nominal size of chickens being cooked, to achieve this effect.

As shown in FIG. 2, it can be seen that the ends of the drumsticks 37 lie in crossed configuration, and sit over the trussing member 15. The weight of the chicken bearing down on the trussing member 15 will also assist in retaining the ends of the drumsticks 37 in crossed configuration. With the legs crossed (or indeed simply held against the body), drying of the flesh in the legs while optimally cooking the breast meat, will be avoided.

It will be appreciated that the manner of fabricating the support assembly may be varied from the bent and welded structure described above, and such variation will fall within the scope of the invention. The embodiment described above is believed to provide the most cost effective implementation of the invention.

Referring now to FIG. 3, the second embodiment comprising a rack 41 including eight support assemblies 43 is shown. The rack comprises a peripheral frame 45 having parallel oblique bars 47 extending internally therefrom. The support assemblies 43 are substantially the same as that depicted in FIGS. 1 and 2, except that they are not mounted using a threaded portion 25 and wingnut 27, but are welded directly to the oblique bars 47. It will be understood that the configuration of the rack is not important to the invention, and will be determined largely by the cooking installation In which it is intended to be employed. It will be also understood that the bars 47 extending between the frame 45 need not extend obliquely, and indeed any configuration of support for the support assemblies may be utilised.

Figure 4:
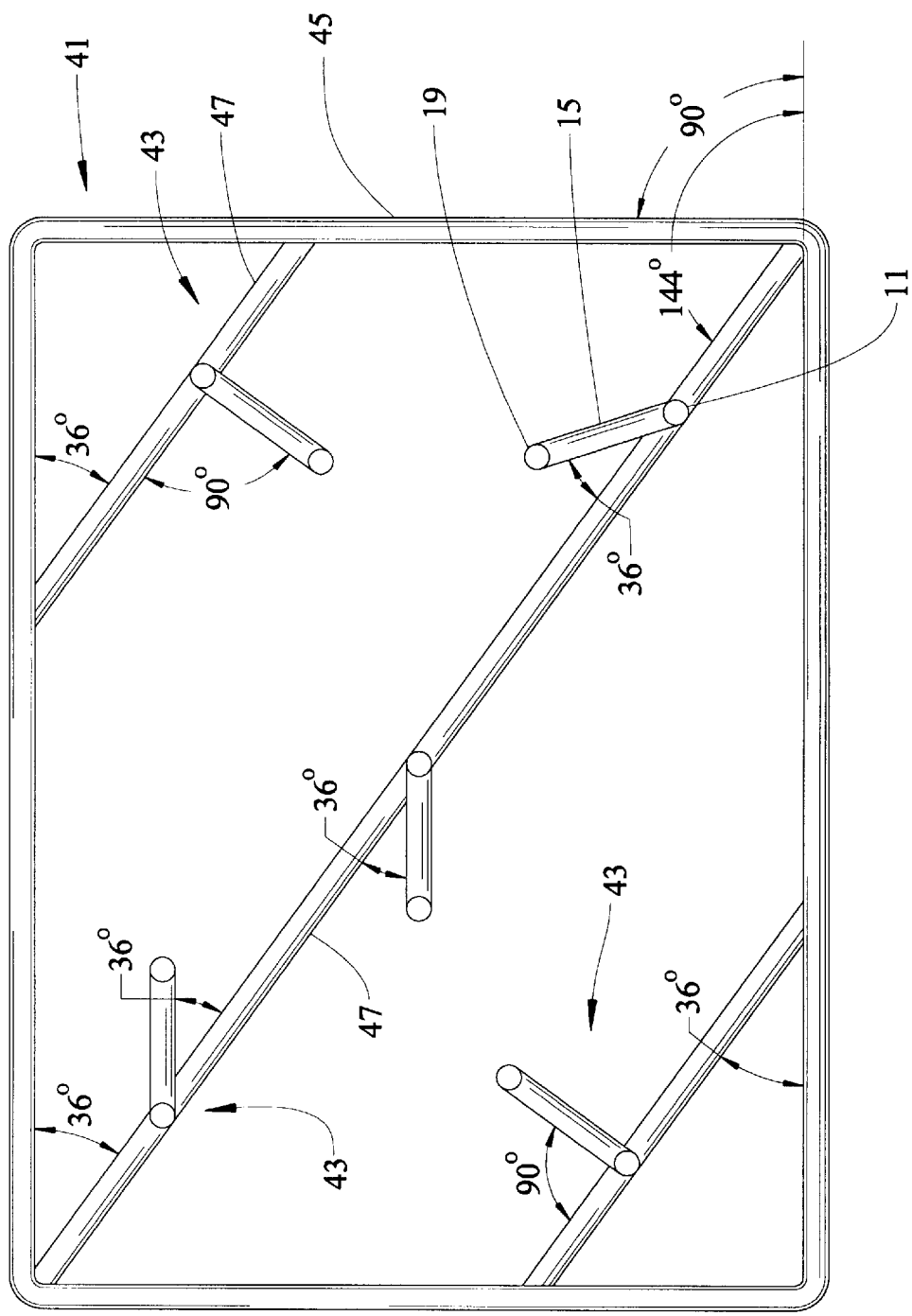
FIG. 4 is a plan view of a rack according to the third embodiment incorporating support assemblies similar to that shown in the first embodiment.

Referring to FIGS. 4 and 5 the third embodiment comprising a rack 41 having five support assemblies 43 is shown. The rack is of similar configuration to the second embodiment, with like reference numerals indicating like parts. However it does differ in that both the rack 41 and attached support members 43 are formed of 8 mm diameter stainless steel round rod. As can be seen, the relative orientations of the support assemblies vary. This is for the purpose of avoiding contact of the chicken when cooking, both with each other and with the peripheral frame 45 and the oblique bars 47, while maintaining a relatively high packing density The rack and its support assemblies of this embodiment are adapted for size 12 chickens which in Australia have a mean weight of 1250 grams (±50 grams), uncooked, unfrozen, gutted, and without savoury stuffing or marinade.

The overall size of the frame 45 which is 365 mm long by 268 mm wide and formed with 8 mm radius bends (measured to the centre-line of the rod) is such that like sized frames may be placed side by side. In an oven to cook the chickens placed thereon, without chickens on adjacent racks contacting each other. Any contact of the chickens with each other or the frame 45 or oblique bars 47 can result in damage to the cooked chicken, particularly resulting in flesh coming away once the chicken is cooked and an attempt is made to remove the chickens from the rack.

Adjacent oblique bars 47 in the rack 41 are located in parallel relationship to each other, spaced 125 mm apart Each support assembly 43 (shown In FIG. 5) is 160 mm high, with the height of the central support member 11 (from the rounded end 13 to the centre-line of the trussing member) being 135 mm. The length of the trussing member 15 is 44 mm (nomninally, measured between the centre-lines of the central support member 11 and the second support member 19), and the length of the second support member 19 is 50 mm (measured to the entre-line of the trussing member 15).

Placement of the central support assembly 43 relative to the top and bottom bars (top and bottom as viewed in the drawing) is 132 mm and 128 mm respectively. Placement of the other support assemblies 43 relative to their nearest horizontal and vertical members forming the peripheral frame 45 is as follows (measured between rod centre-lines):

| top left     | 48 mm | 67 mm | respectively  |
|--------------|-------|-------|---------------|
| top right    | 54 mm | 53 mm | respectively  |
| bottom left  | 62 mm | 50 mm | respectively  |
| bottom right | 53 mm | 68 mm | respectively. |

Figure 6:
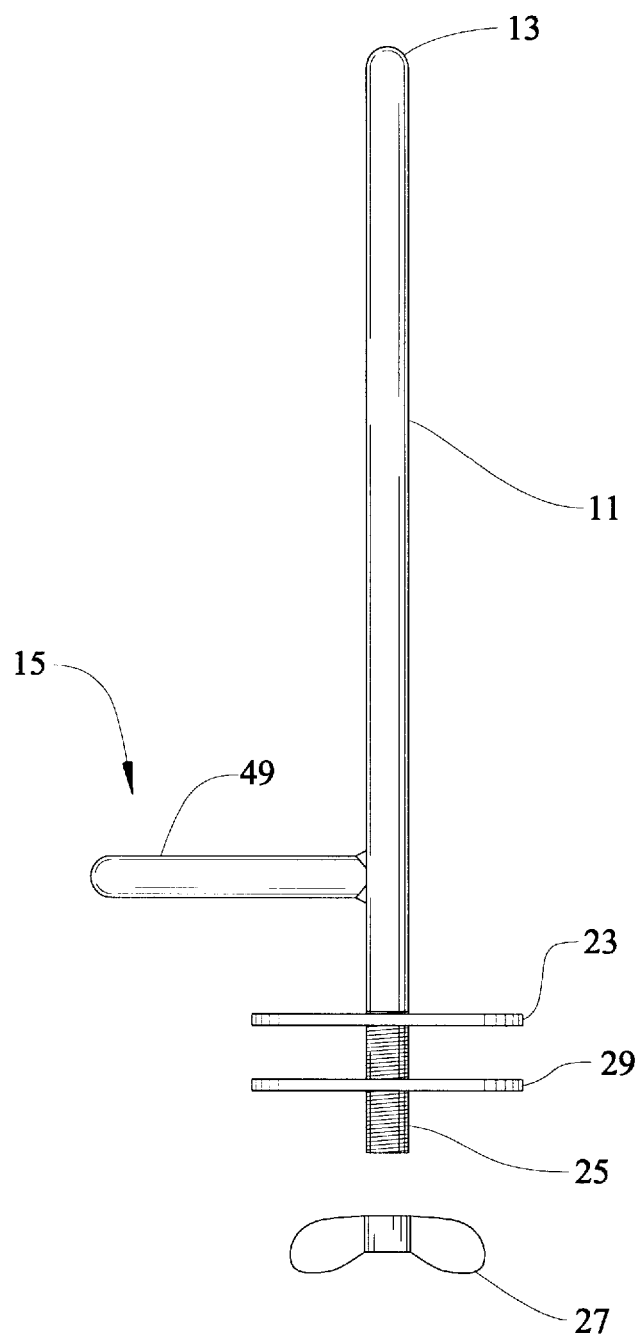
FIG. 6 is a side elevation of a support assembly for holding a chicken for cooking, according to the fourth embodiment.
Figure 7:
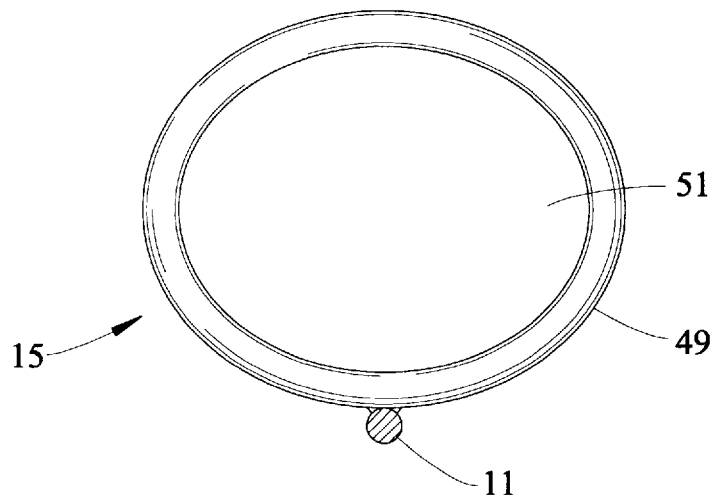
FIG. 7 is a plan view of the support assembly shown in FIG. 6.

The support assembly according to the fourth embodiment shown in FIGS. 6 and 7 is the same as the first embodiment shown in FIG. 1, except that the trussing member 15 comprises an oval shaped ring 49 having a central aperture 51, through which the ends of the drumsticks 37 may protrude in crossed configuration, or touching. In other respects utilisation of the support assembly is the same as in the first embodiment, with the central support member being received in the body cavity of the chicken, however the second support member to push out the breastbone/keel of the chicken is absent.

The fourth embodiment is also constructed of similar material and dimensions to the first embodiment, with the oval shaped ring also being formed of 6 mm diameter stainless steel, having its minimum diameter extending from the central support member 11 for a distance of approximately 56 mm, and having a major diameter of approximately 61 mm.

Figure 9:
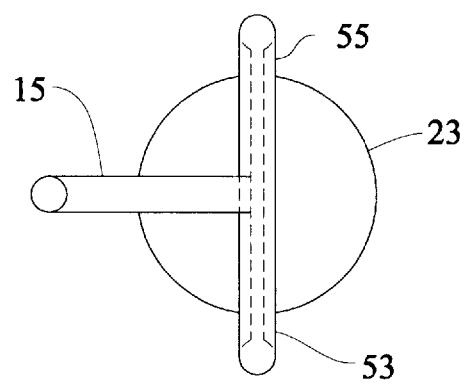
FIG. 9 is a plan view of the support assembly of FIG. 8.
Figure 8:
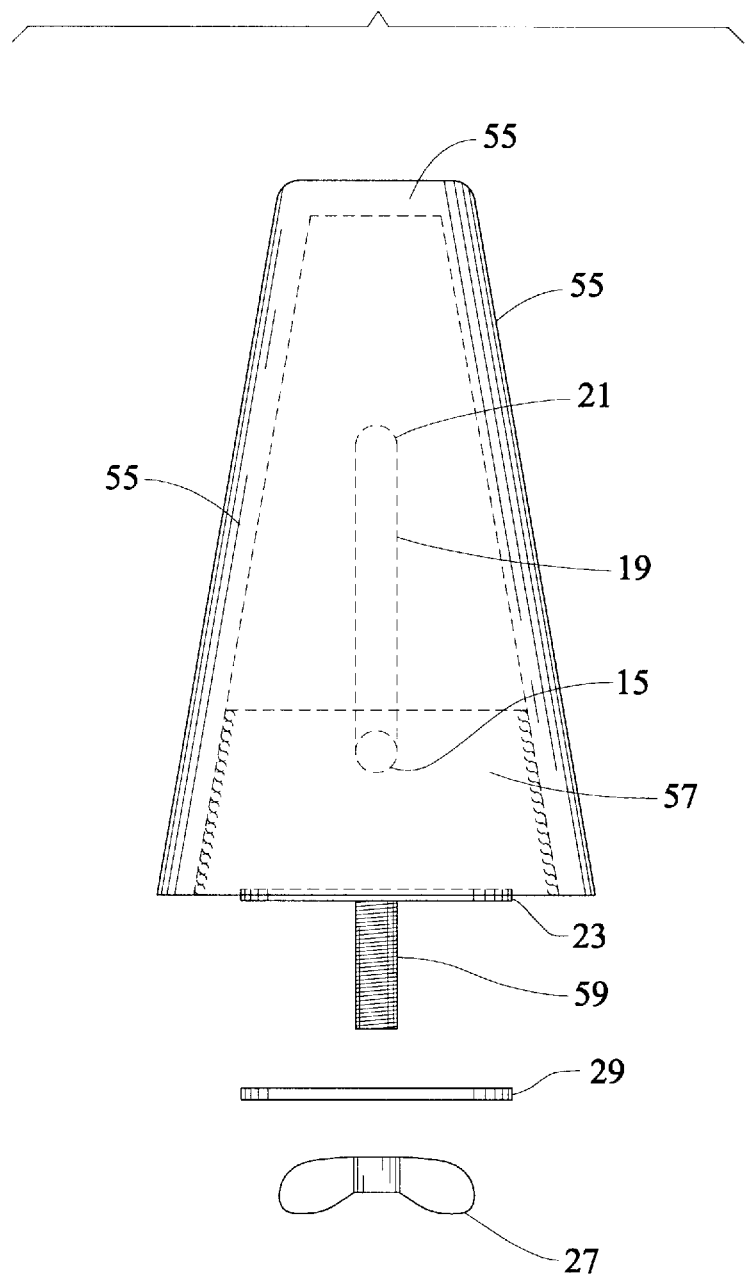
FIG. 8 is a front elevation of a support assembly for holding a chicken for cooking, according to the fifth embodiment.
Figure 10:
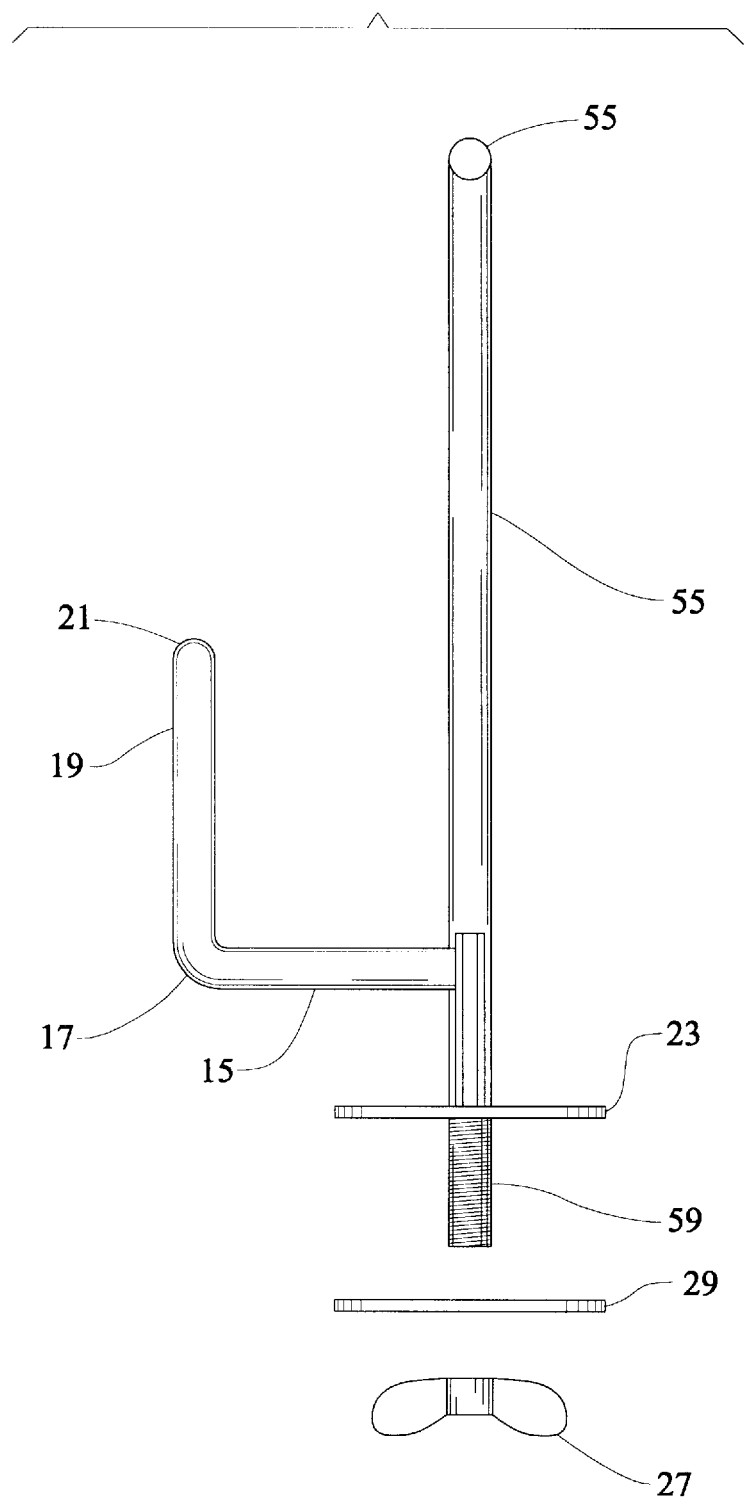
FIG. 10 is a side elevation of the support assembly shown in FIGS. 8 and 9.

The support assembly of the fifth embodiment shown in FIGS. 8, 9, and 10 comprises a central support member 11 in the form an "A-frame" 55, which is formed of 6 mm diameter stainless steel rod, bent to conform to the inverted tapered U-shape shown in FIG. 8. This "A-frame" 55 is of the same general configuration as the "A-frame" referred to in the prior art discussion at the beginning of this specification.

At the lower end of the support assembly there is provided a plate portion 57 which forms a gusset, and is welded to the ends of the "A-frame" 55. A trussing member 15 and second support member 19 assembly, formed of rod, as in the first embodiment, is attached by welding, to the front of the plate 57. A circular disc 23, and threaded rod 59 is welded to the bottom of the plate 57, to provide means for attaching the support assembly according to the fifth embodiment, to a plate or the like, on which it may be mounted. This embodiment is intended for cooking chicken without stuffing. The "A-frame" 55 and second support member 19 are received in the body cavity of the chicken, with the second support member urging the breastbone/keel of the chicken forward, in order to give the chicken a plump appearance. As was the case with the first embodiment, the drumsticks/legs of the chicken site in crossed configuration over the top of the trussing member 15.

Figure 11:
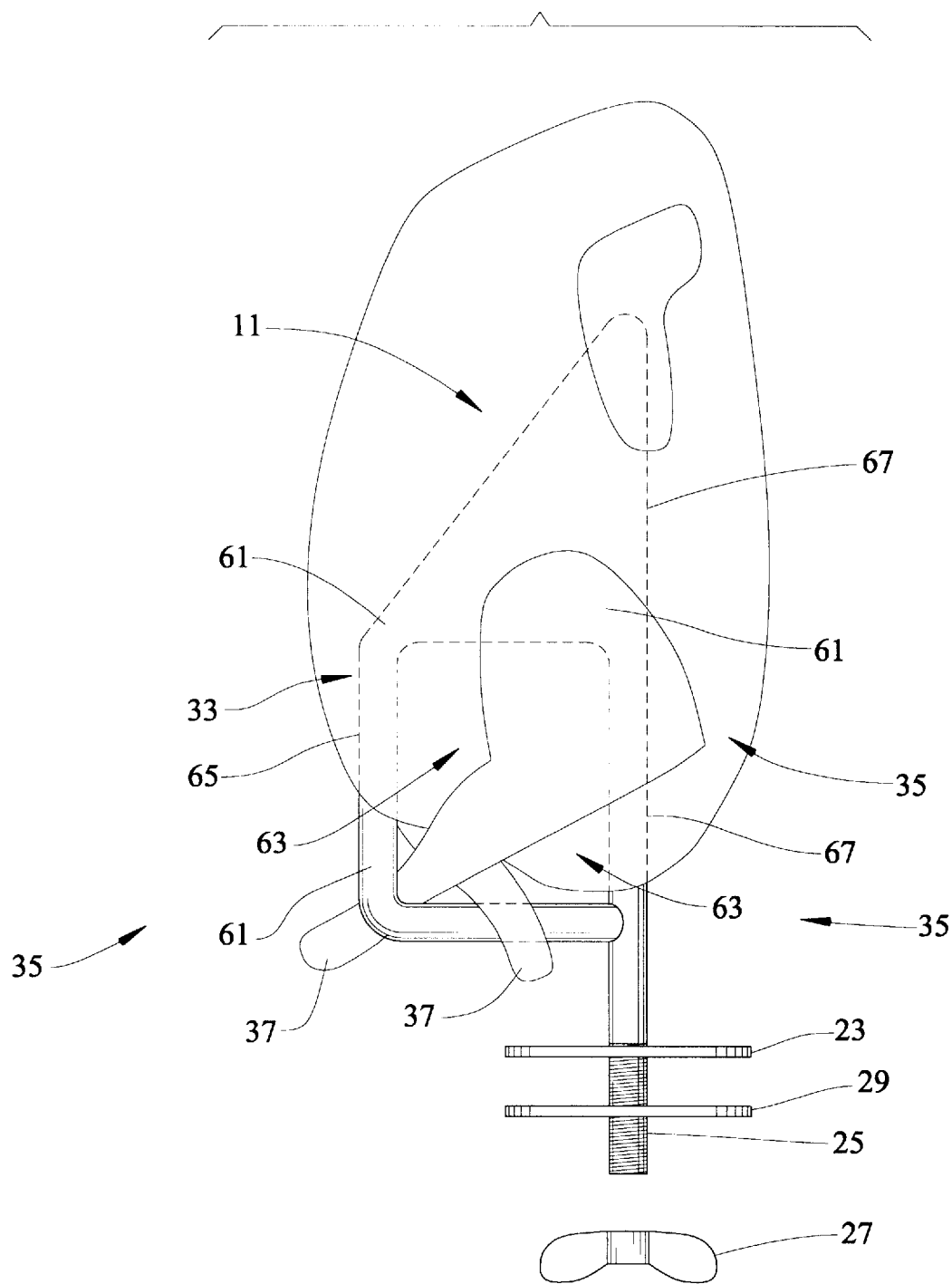
FIG. 11 is a side elevation of a support assembly according to the sixth embodiment, and showing it in use.

Finally, referring to FIG. 11, the sixth embodiment is similar in side elevation outline to the first embodiment as shown in FIG. 1, but includes a central support member 11 in the form of a stainless steel plate 61 having an aperture 63 punched therein, through which the ends of the drumsticks 37 of the chicken may protrude. The front portion 65 of the stainless steel plate 61 sites against the keel/breastbone of the fowl, while the rear portion 67 of the stainless steel plate 61 sites in proximity to the backbone of the fowl. This embodiment is perhaps not suitable where the fowl being cooked tends to readily fall apart once fully cooked, as the fowl may fall apart when being removed from the support assembly, due to the manipulation required to remove the legs from the aperture 63. However where the cooked flesh is more robust, or where it is preferred that the flesh be cooked rare, this embodiment would be expected to be suitable.

It should be appreciated that the scope of the invention Is not limited to the scope of the embodiment described herein. Changes may be made depending on whether the bird being cooked is chicken, duck, turkey, goose, or pheasant or quail. Further, it will be understood that variations to the construction may be made without departing from the spirit and scope of the invention.

I claim:

1. A support assembly for holding a fowl for cooking, said fowl comprising a hollow body having an open posterior end, a neck end generally opposite from said posterior end, and two legs extending from said body in the general direction of said posterior end, said support assembly comprising a generally linear support member arranged to extend into said body through said posterior opening and having a terminal end, and a trussing member fixed rigidly relative to said support member for holding the legs of said fowl in close proximity to each other and to urge substantially closed to minimize the loss of stuffing.

2. A support assembly according to claim 1 wherein said trussing member is attached to said support member at an oblique angle.

3. A support assembly according to claim 1 wherein said trussing member is perpendicularly attached to said support member.

4. A support assembly according to claim 1 wherein trussing member holds said legs across said posterior opening.

5. A support assembly according to claim 4 wherein said trussing member holds said legs in contact with each other.

6. A support assembly according to claim 1 wherein said support member comprises a straight length of round rod.

7. A support assembly for holding a fowl for cooking said fowl comprising a hollow body having an open posterior end, a neck end generally opposite from said posterior end, and two legs extending from said body in the general direction of said posterior end, said support assembly comprising a generally linear support member arranged to extend into said body through said posterior opening and having a terminal end, and a trussing member fixed rigidly relative to said support member for holding the legs of said fowl in close proximity to each other and to said body to substantially close off said posterior opening wherein said trussing member comprises a first end connected to said support member, a second end spaced apart from said support member, and a rod connected to said second end and extending generally in the direction of said body.

8. A support assembly according to claim 7 wherein said rod is generally parallel to said support member.

9. A support member according to claim 7 wherein said rod extends into said body cavity and presses against the breast of said fowl.

10. A support assembly according to claim 7 wherein said rod comprises a first end connected to said trussing member and a second end connected to said support member.

11. A support assembly for holding a fowl for cooking, said fowl comprising a hollow body having an open posterior end a neck end generally opposite from said posterior end, and two legs extending from said body in the general direction of said posterior end, said support assembly comprising a generally linear support member arranged to extend into said body through said posterior opening and having a terminal end, and a trussing member fixed rigidly relative to said support member for holding the legs of said fowl in close proximity to each other and to said body to substantially close off said posterior opening wherein said trussing member holds said legs in a crossed orientation to cover said open posterior end.

12. A support assembly for holding a fowl for cooking, said fowl comprising a hollow body having an open posterior end, a neck end generally opposite from said posterior end, and two legs extending from said body in the general direction of said posterior end, said support assembly comprising a generally linear support member arranged to extend into said body through said posterior opening and having a terminal end, and a trussing member fixed rigidly relative to said support member for holding the legs of said fowl in close proximity to each other and to said body to substantially close off said posterior opening wherein said trussing member includes a ring for receiving the ends of said legs.

13. A support assembly for holding a fowl for cooking, said fowl comprising a hollow body having a neck end, an open posterior end, a breast side extending from said neck end to said posterior end, a back side generally opposite from said breast side, and two legs extending from said body in the general direction of said posterior end, said support assembly comprising a support member extending into said hollow body through said open posterior end and having a first portion for engaging the interior portion of the breast side of said fowl, a second portion for engaging the interior portion of the back side of said fowl, and a trussing portion extending from said first portion for holding said legs in close proximity to said open posterior end to substantially cover said posterior end, wherein -said second portion is generally parallel to said back portion.

14. A support assembly according to claim 13 wherein said support member comprises an A-shaped frame.

15. A support assemble for holding a fowl for cooking, said fowl comprising a hollow body having a neck end, an open posterior end, a breast side extending from said neck end to said posterior end, a back side generally opposite from said breast side, and two legs extending from said body in the general direction of said posterior end, said support assembly comprising a support member extending into said hollow body through said open posterior end and having a first portion for engaging the interior portion of the breast side of said fowl, a second portion for engaging the interior portion of the back side of said fowl, and a trussing portion extending from said first portion for holding said legs in close proximity to said open posterior end to substantially cover said posterior end wherein said first portion, second portion and trussing portion are formed from a rigid plate of material.

16. A support assembly for holding a fowl in a generally vertical orientation for cooking, said fowl comprising a hollow body having a neck end, an open posterior end, a breast side extending from said neck end to said posterior end, a back side generally opposite from said breast side, and two legs extending from said body in the general direction of said posterior end, said support comprising a generally vertical support rod extending into said body through said posterior opening, a rigid trussing member extending perpendicularly to said support rod for holding said legs in a crossed arrangement, said trussing member having a first end attached to said support rod and a second end spaced apart from said support rod, and an extension member extending from said second end toward said fowl and generally parallel to said support rod, whereby the force of gravity presses said fowl body and said legs against said trussing member to close and cover said posterior end of said fowl and presses said extension member against the interior side of said breast side forcing said breast side away from said back side.

* * * * *